Aug. 23, 1927.
C. C. MARBLE
VULCANIZER
Filed Oct. 2, 1926
1,640,281
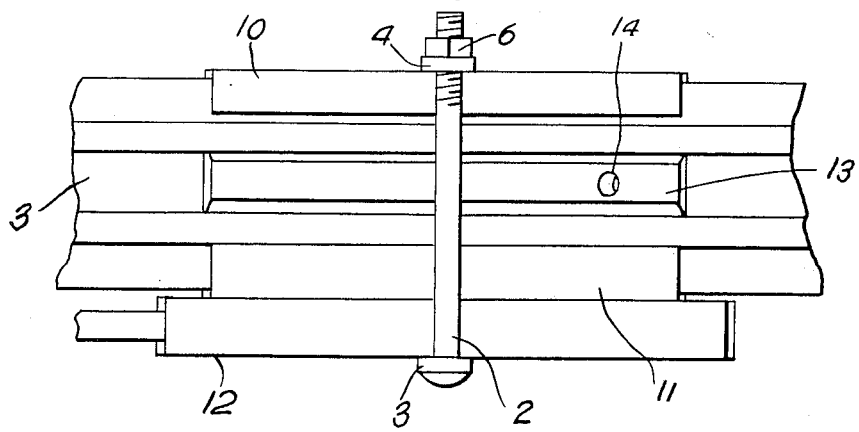
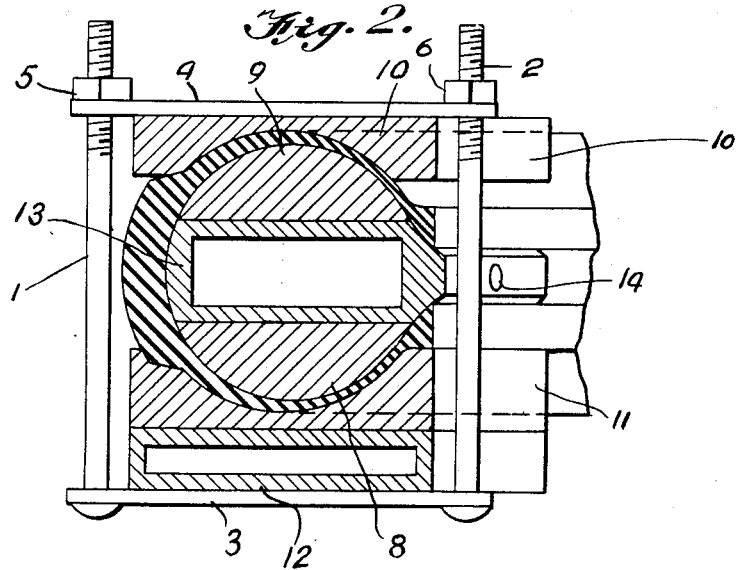
Charles C. Marble
INVENTOR
BY Victor J. Evans
ATTORNEY
WITNESS Patented Aug. 23, 1927.                                       1,640,281

UNITED STATES PATENT OFFICE.

CHARLES C. MARBLE, OF BRADENTON, FLORIDA.

VULCANIZER.

Application filed October 2, 1926. Serial No. 139,132.

This invention relates to vulcanizing repairs on outer tubes or shoes of automobile tires. These shoes are circular tubes of vulcanized rubber of very thick section on the tread portion, tapering to a thin, comparatively flexible section at their open lips more centrally located.

I carry out my vulcanization by clamping the shoe in a curved steam box of comparatively short arc-shaped length introduced through the flexible lips and brought into contact with the shoe at the point where the lips or tread require treatment. I bolster the steam box with curved blocks, the transverse section of which is also arc-shaped and of a curvature approximate to that of the curvature of the shoe. The outside faces of the shoe are engaged by sloping the arc-shaped blocks, and bolts and screw plates serve to bring the shoe under great pressure during vulcanization treatment. Live steam of a temperature suitable for proper vulcanization is introduced to the central box and the treatment continued until the vulcanization is completed. I have found that the best results are secured by employing the sectional metal core of castings of polished aluminum, as well as for the parts of the mold which bear on the outside of the shoe during the vulcanization process. The peculiar adaptability of aluminum for the purpose, I think, is due to its exceedingly great specific heat, being about twice that of iron, and by reason of which it is slower to arrive at vulcanization temperature, thereby more gradually bringing the rubber fabric of the shoe to a vulcanizing temperature, and also for the reason that it takes a beautiful polish leaving the texture of the treated rubber bright, is comparatively inoxidizable, and does not stick to the vulcanized product by reason of the superficial film of aluminum always present on its surface. The aluminum being in immediate contact with the rubber parts being vulcanized by reason of its specific heat takes this heat slower and retains it longer than other metals, particularly iron. Consequently, in the rush of steam heat through the hollow parts variations of temperature are more slowly communicated and consequently the rubber is less liable to be damaged by sudden changes of temperature. Moreover, aluminum is peculiar in that it forms an invisible oxide under ordinary atmospheric conditions, which gives it the quality of not adhering to softened rubber, consequently when taken from the mold after vulcanization the walls of the tire shed readily from the segmental core. I clamp the parts together under a pressure of a ton or more during the vulcanization.

My invention, therefore, consists of a short arc-shaped composite mold as a core, the middle section of which is hollow for application of steam, and cooperating outer mold sections adapted to be clamped under great pressure against the assembled parts during vulcanization. It comprises also other features hereinafter described and specified in the claims.

Referring now to the drawings:

Figure 1 is a view illustrating a section of an automobile shoe clamped between metal blocks for vulcanization.

Figure 2 is a sectional view showing the segmental core and outer blocks.

Figure 3 is a sectional view of an arc-shaped aluminum drum.

Referring now in detail to the drawings, the vulcanizing flask, the several parts of which will be more clearly seen in Figure 2, comprises a plurality of bolts 1, 2 linked over a pair of heavy steel plates 3, 4, the outer one of which may be shifted under screw pressure by nuts 5, 6. The defective tire or shoe is treated by the application of a vulcanizing compound of sulphur and rubber in proper proportions at and around the defective portion or portions. The lips are then spread and the arched segment steam drum 13 inserted axially of the shoe to be treated. The aluminum segments 8, 9 are then introduced to complete the core of the shoe as an unyielding metallic aggregate. Curved aluminum pillow blocks 10, 11 embracing the arched exterior of the shoe are then drawn close by shifting the nuts so as to produce an extremely heavy pressure on the sides and lips of the shoe. The bottom steam drum 12, which may be of iron, is supplied with live steam and simultaneously steam is introduced into the interior segmental drum 13, preferably made of aluminum, to which steam may be admitted by a pipe 14 in its curved face shown at the right. The steam treatment is sufficiently prolonged and the temperature regulated to the best vulcanizing conditions commercially employed. Molds constructed in accordance with my invention occupy a very small amount of room and therefore are readily stored for any considerable number of tire sizes and accomplish remarkable efficient results.

Having thus described my invention, what I claim as new and desire to secure by Letters Patent is:

1. A vulcanizing mold for automobile shoes comprising segmental arc-shaped metal blocks on the sides of a metallic steam drum completely filling a section of the shoe, metal blocks inclosing the outer surface of the shoe, and means for applying heavy pressure during the vulcanization treatment.

2. A vulcanizing mold for automobile tires consisting of segmental sections covering a short segmental arc of the inner walls of the tire, the middle segment being an arcuate hollow steam drum tapering to a narrow flange at the inside of the curve, aluminum segments on the sides of the steam drum to conform to and spread open the tire, aluminum pillow blocks on the outside of the tire, an exterior steam drum at the bottom, and pressure clamps including bolts at the sides of the mold for subjecting the tire to heavy pressure during vulcanization.

In testimony whereof I affix my signature.

CHARLES C. MARBLE.